364-422 SR
OR 2,912,165
SEARCH ROOM

Nov. 10, 1959 W. L. POLAND 2,912,165

COMPUTER

Filed May 6, 1955 2 Sheets-Sheet 1

INVENTOR.
WILLIAM L. POLAND
BY William R. Sherman
HIS ATTORNEY

Nov. 10, 1959 W. L. POLAND 2,912,165

COMPUTER

Filed May 6, 1955 2 Sheets-Sheet 2

*INVENTOR.*
WILLIAM L. POLAND

*BY* William R. Sherman

HIS ATTORNEY 2,912,165
Patented Nov. 10, 1959

2,912,165

COMPUTER

William L. Poland, Bethel, Conn., assignor, by mesne assignments, to Schlumberger Well Surveying Corporation, Houston, Tex., a corporation of Texas Application May 6, 1955, Serial No. 506,548

2 Claims. (Cl. 235—193)

Figure 1:
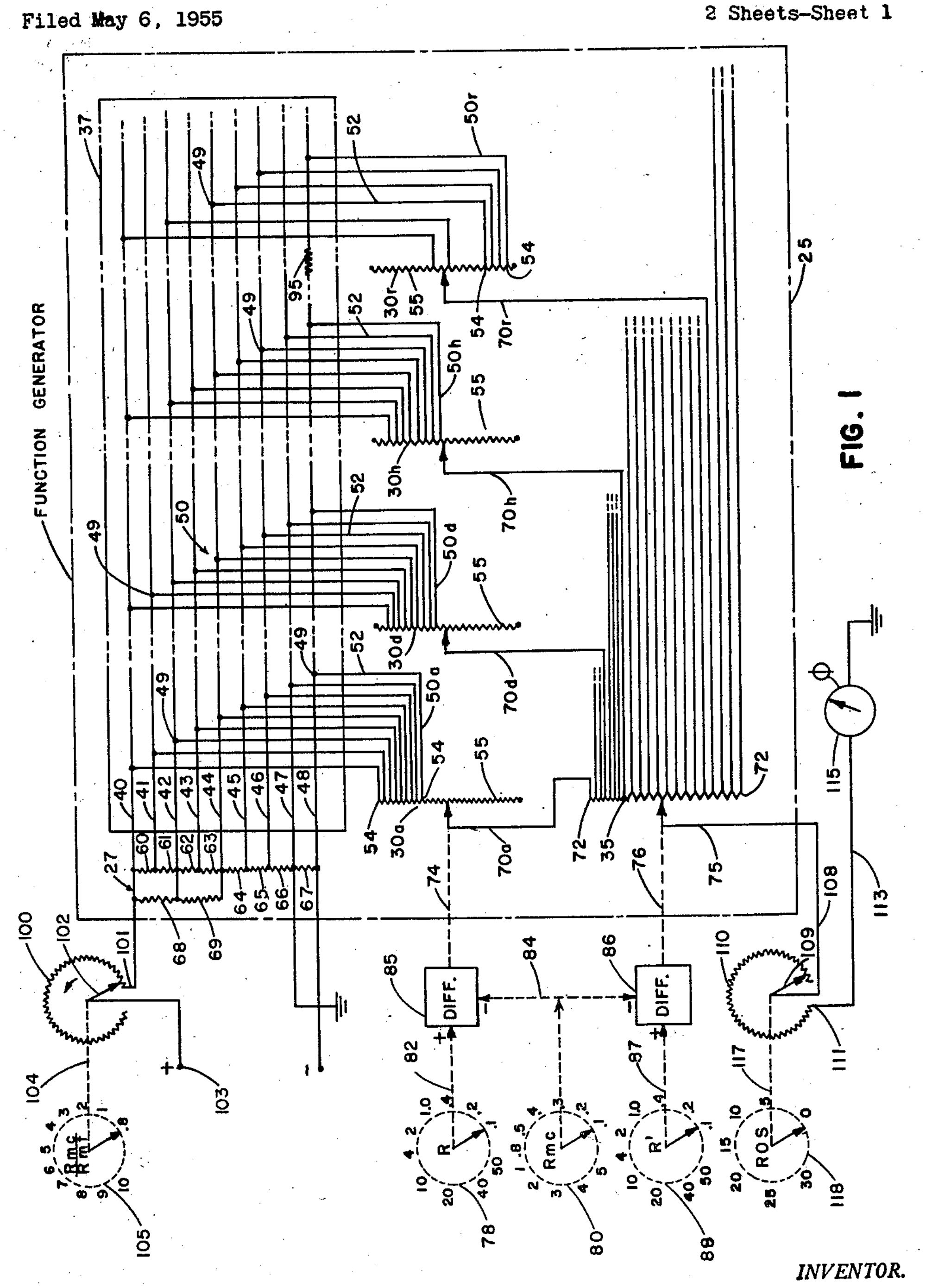

This invention relates to computers, and more particularly, to computers for the solution or generation of functions dependent upon two or more variables.

Many physical relationships are expressed mathematically in terms of a non-linear or empirical function of two or more variables. In determinations of formation porosity by well logging techniques, for example, a value of porosity is derived from an empirical, non-linear function of two measured values of resistivity. This function is presently represented by nomograms and charts.

To obtain an automatic or semi-automatic solution of such function requires a two-variable function generator. A function generator for representing a non-linear function of two variables is schematically shown on page 260 of Electronic Analog Computers, by Korn and Korn, a publication of the McGraw-Hill Book Company, Inc., in 1952. This function generator employs potentiometers with a non-linear relationship between wiper position and resistance. The wipers of these non-linear potentiometers are gang-driven by a shaft positioned in accordance with one variable. To introduce the second variable, an interpolating potentiometer has uniformly spaced tap points electrically connected to these wipers and has its own wiper positioned in accordance with a second variable. The potential on the wiper of the interpolating potentiometer is thereby made a function of the two variables.

This generated function, however, will not conform with the desired value between tap points of the interpolating potentiometer due to a relatively heavy and irregular loading by the non-linear potentiometers. Also due to this loading, indicating devices or the like for utilizing the functionally varied potential on the interpolating wiper must offer a high impedance. A further disadvantage lies in the fact that each of the non-linear potentiometers must be specially constructed at a considerable expense for each function to be represented. Consequently, a function generator constructed in accordance with the cited publication will lack versatility and be poorly adapted to an achievement of accuracy, especially with utilization devices which draw current.

It is the object of the present invention, accordingly, to provide a new and improved computer which overcomes the disadvantages of the above-described function generator.

Another object of the invention is to provide reliable and relatively inexpensive apparatus for generating a function of two variables.

Another object of the invention is to provide a versatile function generator for representing a variety of two variable functions.

A further object of the invention is to provide a function generator in which resistive loading effects are minimized for enhanced accuracy.

Yet another object of the invention is to provide an improved two-variable function generator particularly suited to determinations of porosity.

Still another object of the invention is to provide computing apparatus incorporating such a function generator in a novel way to determine the porosity of earth formations.

These and other objects of the invention are obtained by interconnecting a resistor network selectively with linear resistance elements of ganged-tapped potentiometers to establish a potential variation at the potentiometer wipers. The wiper potentials, which vary with one input variable, are applied to selected taps of a translating potentiometer. By moving the wiper of the translating potentiometer to a position corresponding to a second input variable, a current is derived representing a prescribed function of both variables.

For a determination of porosity, a positional input is applied to the ganged linear potentiometers in accordance with one value of formation resistivity. A positional input corresponding to the other value of formation resistivity is applied to the translating potentiometer. By means of a rheostat in series connection with the resistor network, the current drawn from the wiper of the translating potentiometer is made to represent the porosity of a water-bearing formation. To obtain porosity values for oil-bearing formations, a second rheostat is connected in series with the wiper of the translating potentiometer suitably to modify the current derived therefrom.

Figure 2:
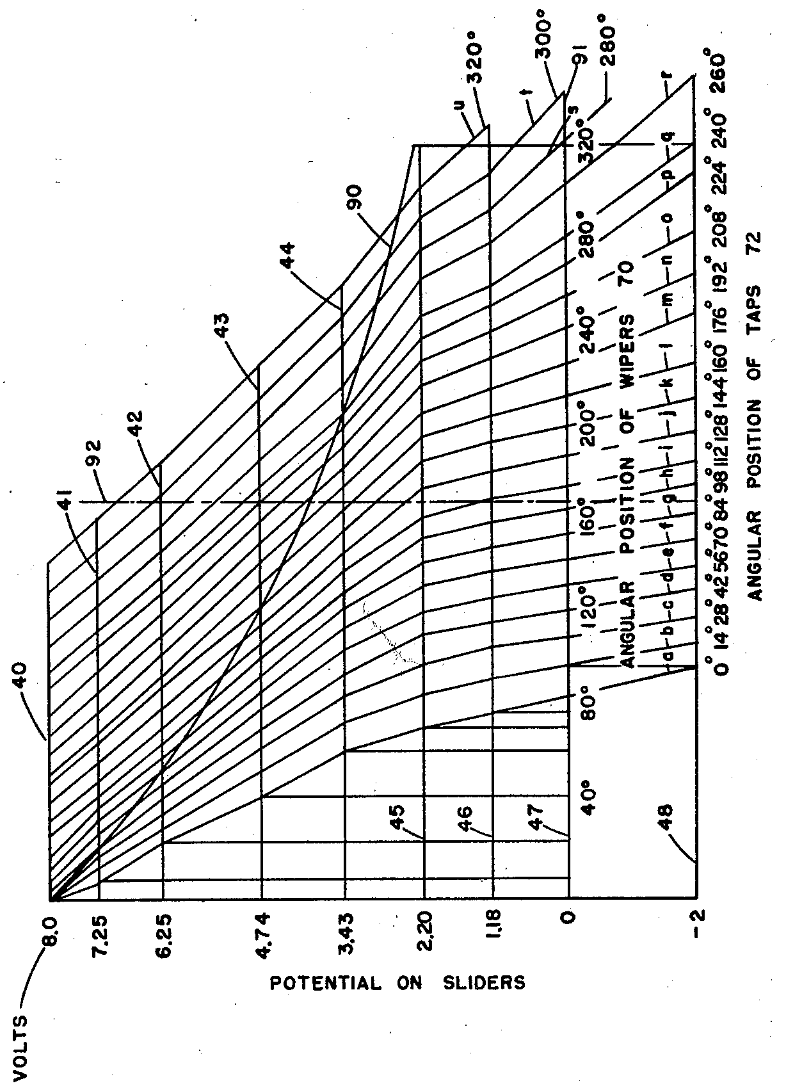

The invention will be better understood, and others of its objects and advantages perceived, from the following detailed description of an exemplary embodiment taken in conjunction with the drawings, in which:

Fig. 1 is a schematic diagram illustrating apparatus constructed in accordance with the invention and adapted for performing porosity computations; and Fig. 2 is a graphical illustration of the variation in potential with wiper position for the ganged linear potentiometers of Fig. 1.

In the present practice of well logging, electrical resistivity measurements are made in porous and permeable formations which, through exposure to drilling mud, have a zone lying behind the borehole wall which is flushed of connate water by the penetration of mud filtrate. If a permeable formation is oil-bearing, a residual amount of oil will remain in the pores of the flushed zone. On the borehole wall bounding either an oil-bearing or a water-bearing permeable formation, a mud cake usually is formed with a thickness on the order of one inch. Such formations may be characterized by a formation factor F which is the ratio of the resistivity $R_{xo}$ of the flushed zone and the resistivity $R_{mf}$ of the mud filtrate. The porosity $\phi$ is related to the formation factor F in accordance with the Humble formula as equaling the expression $(a/F)^{1/m}$, where $a$ and $m$ are constants such as 0.62 and 2.15, respectively. Thus, the following expression for porosity holds:

$$\phi=\left(a\frac{R_{mf}}{R_{xo}}\right)^{1/m}$$

While this relationship holds for water-bearing formations, a small amount of oil remaining in the flush zone pores of oil-bearing formations requires the modified expression $$\phi=\frac{1}{1-ROS}\left(a\frac{R_{mf}}{R_{xo}}\right)^{1/m}$$

where ROS is the fractional residual oil saturation.

To derive a value of $R_{mf}/R_{xo}$, techniques disclosed in Patent No. 2,669,688, issued February, 1954, to H. G. Doll are employed for making at least two in situ measurements of resistivity in highly localized regions of a borehole. In porous and permeable formations exposed to drilling mud, one value of resistivity R is predominantly influenced by the mud cake resistivity $R_{mc}$, and the second value of resistivity R′ is predominantly influenced by the flushed zone resistivity $R_{xo}$. Therefore, the resistivity value R will hereinafter be referred to as the mud cake influenced resistivity and the value R′ will hereinafter be referred to as the flushed zone influenced resistivity.

To solve the porosity equation utilizing measured values of R, R′, $R_{mc}$, $R_{mf}$ and ROS as defined above, there is provided by this invention an analog computer shown in Fig. 1. This computer includes a function generator 25 incorporating a resistor network 27, a set 30 of twenty-one ganged tapped potentiometers, only representative potentiometers 30*a*, 30*d*, 30*h* and 30*r* being shown for convenience of illustration, and a translating potentiometer 35.

Between the resistor network 27 and the ganged potentiometers 30 in an array 37 of interconnections. This array 37 comprises a plurality of conductors or bus bars 40—48 arranged in parallel and connected at points 49 with twenty-one sets 50 of parallel conductors 52. Again for convenience, only sets 50*a*, 50*d*, 50*h*, and 50*r* are illustrated corresponding to ganged potentiometers 30*a*, 30*d*, 30*h*, 30*r*. The conductors 52 included in each of the sets 50 connect with taps 54 spaced along resistance elements 55 of the ganged potentiometers 30. The connections 49 are made between selected conductors 40—48 and the conductors 52 so that the taps 54 of one of the potentiometers 30 are selectively connected with taps of the other potentiometers and with the conductors 40—48. The conductors 40—48 thus provide parallel connections across different portions of the resistance elements 55 in accordance with the pattern of connections.

To represent the function of $R_{xo}$ required in the solution of the porosity equation, the illustrated patterns of connections 49 and spacing of taps 54 are employed. The manner of determining these patterns and spacing will be described hereafter in conjunction with Fig. 2. It may be observed, however, that the taps 54 have specific, generally non-uniform spacings along the resistance elements 55, dividing the same into generally unequal segments. Crowding of the taps 54 occurs in a zone in which a relatively high function slope and hence potential gradient occurs.

To provide specifically related potentials on the conductors 40—48, a potential divider is formed with the resistance elements 55 by the connection across the conductors 40—48 of resistor network 27. This network consists of resistors 60—67 connecting adjacent pairs of conductors 40—41, 41—42, through 47—48; resistor 68 connecting conductors 40 and 42; and resistor 69 connecting conductors 42 and 44. In configuration, the resistor network 27 is like an equivalent resistive network of the tapped and interconnected resistance elements 55. Thus, there is one resistor in the resistor network 27 connecting each pair of conductors 40—48 which have adjacent connections with two points along any of the resistance elements 55. Resistor 68, for example, connects conductors 40, 42 which have connections with adjacent taps of potentiometer 30*r*.

The values of the padding resistors 60—69 required for setting conductors 40—48 at specific relative potentials depend upon the values of the parallel resistances introduced between the conductors 40—48 by the tapped segments of resistance elements 55. The latter resistance values, in turn, depend upon the resistance per unit length of the resistance elements, and the positions of the taps. The values of resistors 60—69 are obtained, then, by the solution of simultaneous linear equations in any well known manner. The constraints of these equations are such that only one of resistors 60—69 has an arbitrary value which, if desired, may be infinite (yet considered as existing for convenience of expression). To obtain both negative and positive potentials, an intermediate conductor, such as 47, may be grounded.

To translate the potentials on resistance elements 55 into a potential representing the function value, each of the potentiometers 30 has a wiper or slider 70 (70*a*, 70*d*, 70*h*, and 70*r* are shown) connected to a corresponding tap 72 positioned along resistance element 73 of the translating potentiometer 35. Such taps 72 have specific, non-uniform spacings, which are determined for the function represented. The wipers 70 are mechanically coupled or ganged to a common shaft 74 for positioning in accordance with a first input variable. A wiper or slider 75 for the translating potentiometer 35 is connected to a second shaft 76 for positioning in accordance with the second input variable. While potentiometers 30 and 35 may be of a rectilinear type, they are preferably single turn rotary potentiometers whereby the angular positions of shafts 74, 76 determine their wiper settings.

The empirical relationship between the flushed zone resistivity $R_{xo}$, the mud cake influenced resistivity R and the flushed zone influenced resistivity R′ is dependent upon the mud cake resistivity $R_{mc}$. For a functional representation of this relationship for all values of $R_{mc}$, the inputs conveniently are in terms of $R/R_{mc}$ and $R'/R_{mc}$. To this end the positional inputs for shafts 74, 76 are the logarithms of the ratios $R/R_{mc}$ and $R'/R_{mc}$, respectively, in order that the ratios may conveniently be formed. To obtain a logarithmic input of $R/R_{mc}$ on shaft 74, logarithmically calibrated dials 78 and 80 for R and $R_{mc}$, respectively, are coupled by shafts 82, 84 through a differential 85 to this shaft 74. Differential 85 affords a positive coupling between shafts 82, 74 and a negative coupling between shafts 84, 74. In turning shaft 74 as the difference of the logarithmic inputs, the differential 85 positions shaft 74 as the logarithm of the ratio of the settings on dials 78 and 80.

Similarly, a differential 86 coupled by shaft 87 to a logarithmically calibrated dial 88 for R′ affords a positive driving connection to shaft 76. At the same time, the differential 86 affords a negative coupling between shafts 84 and 76. Thus, shaft 76 is positioned in accordance with the logarithm of the ratio $R'/R_{mc}$ as set on the dials 80, 88. All of the dials 78, 80, 88 are calibrated in the same units, namely, ohm meters. Since mud cake resistivity $R_{mc}$ generally is lower than either of the measured formation resistivities R, R′, dials 78, 88 may have a range of 0.1 to 50 ohm meters while dial 80 has a range of 0.1 to 5 ohm meters.

Characterizing the function represented by the above-described function generator 25 is the graph of Fig. 2. In the graph, a family of curves lettered "*a*" through "*u*" to correspond with the twenty-one ganged potentiometers 30 relate the potentials on the sliders 70 as a function of their angular position. Representative potentials for the conductors 40—46, 48, relative to grounded conductor 47 are indicated by similarly numbered lines 40—48 on the graph. Since the sliders 70 for the potentiometers 30 have, in a convenient design, a full arc of travel equal to 320°, the abscissa of the graph is plotted over the same range. Lines 90 and 91 indicate, respectively, the upper and lower limits of the range in which the function generator is designed for accurate utilization in a particular application. Since all of the sliders 70 are ganged to shaft 74 and thus have the same angular position for each shaft position, line 92 may be taken as representing a given shaft position such as the nearly 170° position shown in Fig. 1.

To determine the angular placement of the taps 54, the angular value for each intersection of a given curve with lines 40—48 is ascertained. Thus, for the nine taps of potentiometer 30*a*, the angular positions will correspond with the intersections of curve *a* with lines 40—48. The potentials applied to conductors 40—48 are, on the other hand, prescribed so as to approximate by linear interpolations the curves *a* through *u* within the limits of desired accuracy. Thus, the potentials differ by smaller steps in regions of higher curvature. Suitable angular positions for the taps 72 are indicated on the associated lines *a* to *u*.

In order that a proper contour within the bounds 90, 91 may be preserved for the curves $r$ through $u$ by their continuation beyond the 320° limit, resistors such as resistor 95 may be series connected between appropriate junction points 49 in the array 27. These resistors serve in lieu of an extension of the corresponding resistance elements 55 beyond their 320° terminus.

While the function generator 25 together with the mechanical inputs to shafts 74 and 76 may be applied with utility to the solution of porosity and formation factor problems independently of other portions of the apparatus, these other portions facilitate a rapid and semiautomatic solution, in this case, for porosity. Such other portions include a rheostat 100 having one terminal 101 of its resistance element connected to conductor 40 and its slider 102 serially connected to the positive terminal 103 of a regulated voltage power supply (not shown). Slider 102 is also mechanically coupled by shaft 104 to a calibrated dial 105. This dial is calibrated non-linearly in values of $R_{mc}/R_{mf}$ from eight-tenths to ten in accordance with the equation $$\frac{\theta}{\theta_{\max}}=\frac{1}{K}\left[\left(\frac{1}{0.80}\frac{R_{mc}}{R_{mf}}\right)^{\frac{1}{m}}-1\right]$$

where $\theta$ is the angle of a calibration mark, $\theta_{\max}$ is the angular range of the dial, and K is a constant of suitable value.

Slider 75 of the interpolation potentiometer 35 is connected by a conductor 108 to the slider 109 of a rheostat 110. The resistance element of this rheostat 110 has one terminal 111 connected in series by conductor 113 through an indicating device 115 to ground. While the indicating device 115 may have a variety of suitable forms, for field applications it preferably is a shock-resistant microammeter. Slider 109 is mechanically coupled by a shaft 117 to a dial 118 bearing values from 0 to 30 in a linear calibration of fractional residual oil saturation ROS.

In operation, the previously determined values of $R_{mc}$, $R_{mc}/R_{mf}$ and ROS are set into the corresponding dials 80, 105 and 118. Values of R and R′, derived for example in the manner set forth in aforementioned Patent No. 2,669,688, are set on dials 78, 88. Since dial 78 applies a positive positional input to the differential 85 representing the logarithm of the mud cake influenced resistivity R and dial 80 applies a negative positional input representing the logarithm of mud cake resistivity $R_{mc}$, the position of the sliders 70 will be proportioned to the logarithm of the ratio of R to $R_{mc}$. Sliders 70 are thus set to a given angular position, such as that represented by line 92 in Fig. 2. Similarly, rotational positioning of shaft 76 will be proportional to the logarithm of the ratio between R′ and $R_{mc}$ and will determine the angular positioning of the slider 75 for the translation potentiometer 35.

If the potential on conductor 40 were equal to the regulated potential of positive terminal 103, the potential on slider 75 of the translation potentiometer 35 would represent the expression $(aR_{mc}/R_{xo})^{1/m}$. However, reduction of the potential on conductor 40 by the setting of the rheostat 100 through dial 105 causes the potential on slider 75 to vary as the expression $(aR_{mf}/R_{xo})^{1/m}$. In other words, the rheostat 100 introduces the factor $(R_{mf}/R_{mc})^{1/m}$ by modifying the potential available to the function generator 25.

As the value indicated by the microammeter 115 is dependent on the value of current flowing from the slider 75, its porosity indication will be inversely proportional to the resistance introduced by the rheostat 110. The connection of the rheostat 110 is such that with increasing values of ROS, the inserted resistance decreases. In this manner, the inserted resistance is caused to vary in accordance with the expression $(1-ROS)$, whereby it affects the reading of the galvanometer 115 in proportion to the factor $$\frac{1}{1-ROS}$$

Thus it will be seen that a reading given by the porosity indicating device 115 is made proportional to the Humble formula $$\frac{1}{1-ROS}(aR_{mf}/R_{xo})^{1/m}$$

where the constants $a$ and $m$ may be 0.62 and 2.15, respectively.

It will be evident that the computer of this invention can be arranged for generating a variety of other functional relationships involving similar or widely different functions of two or more variables. Thus, indications of formation factor or flushed zone resistivity may be derived (the latter without the use of rheostat 110) by a modification of the resistor network 27, the pattern of connections 49, and the positioning of the taps 54 and 72 on potentiometers 30 and 35. By another modification, an empirical function suitable for a contactor servo system of the type described in H. G. Doll Patent No. 2,463,362 might be generated. The choice of resistance values, connection patterns, and tap positions for any specific function can readily be made on the basis of resistance network theory and requires no further elaboration here. It has been found that potentiometers with prescribed tap positions are available as readily and economically as uniformly tapped potentiometers.

To provide a function generator, not for a particular function, but one readily manipulated to generate any single-valued function of two variables, the calibration of the dials and the spacing of the taps may be uniform. Then, by an adjustment of the resistor network 27 and the patterns of connections 49, the desired function can be set up. To facilitate alteration of the connections 49, the array 37 may be constructed as a plugboard. While particular numbers of voltage carrying lines 40—48, conductor sets 50 and associated ganged potentiometers 30 have been shown, larger or smaller numbers may be employed to suit particular purposes. In general, of course, the greater the number of such lines, ganged potentiometers and taps, the higher may be the accuracy obtainable from the function generator. Where automatic rather than semiautomatic computation is desired, the potentiometer wipers can be driven by signal-responsive, positional servo-mechanisms and a recording device such as a recording-type galvanometer may be utilized in lieu of the microammeter to obtain a continuous record of the solutions. In such form, the function generator of this invention may be incorporated in a servo control loop, such as that disclosed in aforementioned Patent No. 2,463,362.

Additional modifications in form and detail may be made within the scope of the invention. The invention is, therefore, not to be limited to the illustrative embodiment but is of a scope defined in the appended claims.

I claim:

1. In apparatus for computing porosity from values of mud cake and mud filtrate resistivity and from formation resistivity values, one of which is primarily influenced by mud cake resistivity and the other of which is primarily influenced by flushed zone resistivity, the combination comprising ganged potentiometers each including a linear resistance element and a wiper, a plurality of conductors to have prescribed relative potentials, each of said resistance elements having taps spaced therealong and connected with said conductors in accordance with a potential variation specified for the corresponding potentiometer, a resistor network interconnecting said conductors to form with said resistance elements a potential divider for relating the potentials of said conductors as prescribed, means for positioning said wipers in accordance with the logarithm of the ratio between one formation resistivity value and the value of mud cake resistivity, a translating potentiometer having a wiper and a resistance element with spaced taps to which the wipers of said ganged potentiometers are connected, means for positioning the wiper of said translating potentiometer in accordance with the logarithm of the ratio between the other formation resistivity value and the mud cake resistivity, said positioning means for said ganged potentiometers and said translating potentiometer comprising a pair of differentials each having an output shaft and a negative and a positive input shaft, said output shafts being connected respectively to said ganged potentiometers and to said translating potentiometer for adjusting the positions of their wipers, separate dial means calibrated logarithmically in values of the respective formation resistivities and being in driving connection with the respective positive input shafts, and dial means logarithmically calibrated in values of mud cake resistivity and in common driving connection with said negative input shafts, a rheostat connected in series with said resistor network between terminals to which a regulated potential difference may be applied, means for adjusting the resistance of said rheostat in accordance with a function of the ratio between the mud cake and mud filtrate resistivity values, and an indicating device series connected with the wiper of said translating potentiometer to provide an indication of porosity.

2. In apparatus for computing porosity from values of mud cake and mud filtrate resistivity and from formation resistivity values, one of which is primarily influenced by mud cake resistivity and the other of which is primarily influenced by flushed zone resistivity; the combination comprising ganged potentiometers each including a resistance element and a wiper, a plurality of conductors to have prescribed relative potentials, each of said resistance elements having taps spaced therealong and connected with said conductors in accordance with the potential variation required for the corresponding potentiometer in conformity with the Humble formula, a resistor network interconnecting said conductors to form with said resistance elements a potential divider for relating the potentials of said conductors as prescribed, said resistor network comprising a plurality of padding resistors connected in series and padding resistors connected in parallel with selected combinations of said series resistors, one such resistor connecting each pair of conductors which have adjacent connections with two taps of a given resistance element, means for positioning the wipers of said ganged potentiometers in accordance with the logarithm of the ratio between the mud-cake-influenced formation resistivity value and the mud cake resistivity value, a translating potentiometer having a wiper and a resistance element with spaced taps to which the wipers of said ganged potentiometers are connected, means for positioning the wiper of said translating potentiometer in accordance with the logarithm of the ratio between the flushed-zone-influenced formation resistivity value and the value of mud cake resistivity, said positioning means for said ganged potentiometers and said translating potentiometer comprising a pair of differentials each having an output shaft and a negative and a positive input shaft, said output shafts being connected respectively to said ganged potentiometers and to said translating potentiometer for adjusting the positions of their wipers, separate dial means calibrated logarithmically in values of the respective formation resistivities and being in driving connection with the respective positive input shafts, and dial means logarithmically calibrated in values of mud cake resistivity and in common driving connection with said negative input shafts, a rheostat connected in series with said resistor network between terminals to which a regulated potential difference may be applied, means for adjusting the resistance of said rheostat in accordance with a function of the ratio between the mud cake and mud filtrate resistivity values required to conform with the Humble formula, and an indicating device connected in series with the wiper of said translating potentiometer for providing indications of porosity.

References Cited in the file of this patent

UNITED STATES PATENTS

| | | |
|---|---|---|
| 1,930,545 | Wensley | Oct. 17, 1933 |
| 2,536,495 | Ewing | Jan. 2, 1951 |
| 2,662,147 | Wilentchik | Dec. 8, 1953 |
| 2,698,134 | Agins | Dec. 28, 1954 |
| 2,710,723 | Nettleton et al. | June 14, 1955 |

FOREIGN PATENTS

| | | |
|---|---|---|
| 650,084 | France | Jan. 4, 1929 |

OTHER REFERENCES

Electronic Instruments (Greenwood et al.), published by McGraw-Hill Book Co., New York, 1948, page 58.

"A Generalized Analogue Computer for Flight Simulation" (Hall), AIEE Technical Paper 50–48, December 1949.

Electronic Analog Computers (Korn and Korn), published by McGraw-Hill Book Co., New York, 1952, pages 260 and 263.